United States Patent [19]
Day

[11] Patent Number: 5,095,693
[45] Date of Patent: Mar. 17, 1992

[54] HIGH-EFFICIENCY GAS TURBINE ENGINE
[75] Inventor: William H. Day, Avon, Conn.
[73] Assignee: United Technologies Corporation, Hartford, Conn.
[21] Appl. No.: 702,143
[22] Filed: May 13, 1991

Related U.S. Application Data
[63] Continuation of Ser. No. 389,630, Aug. 4, 1989, abandoned.
[51] Int. Cl.⁵ .............................................. F02C 7/18
[52] U.S. Cl. ................... 60/39.05; 60/39.59; 60/736
[58] Field of Search ............... 60/39.05, 39.55, 39.59, 60/736, 39.5, 39.53

[56] References Cited
U.S. PATENT DOCUMENTS

| | | | |
|---|---|---|---|
| 3,080,716 | 3/1963 | Cummings et al. | 60/736 |
| 3,921,389 | 11/1975 | Kawaguchi | 60/39.59 |
| 4,054,107 | 10/1977 | Horlitz, Jr. | 122/7 B |
| 4,137,705 | 2/1979 | Andersen et al. | 60/39.08 |
| 4,214,450 | 7/1980 | Nagashima et al. | 60/648 |
| 4,404,793 | 9/1983 | Coffinberry | 60/39.07 |
| 4,550,561 | 11/1985 | Coffinberry | 60/39.02 |
| 4,602,478 | 7/1986 | Kelly | 60/39.163 |
| 4,631,914 | 12/1986 | Hines | 60/39.05 |
| 4,709,546 | 12/1987 | Weiler | 60/39.29 |

FOREIGN PATENT DOCUMENTS
899312 6/1962 United Kingdom ................. 60/736

Primary Examiner—Louis J. Casaregola
Attorney, Agent, or Firm—William J. Sapone

[57] ABSTRACT

A high efficiency/low nitric oxide emission gas turbine engine includes an interchanger for cooling a compressed air side stream which is used for cooling the turbine section. The heated fuel is then mixed with steam for injection into a combustor, thereby reducing nitric oxide emissions, while preventing condensation during mixing. Where water is used for injection instead of steam, both the fuel and water are preheated by interchange with the hot compressed gas stream. Preheating the fuel and/or water prevents steam condensate or water from entering the combustor, and does so using heat available within the gas turbine cycle thereby increasing overall turbine efficiency. In addition, utilizing a fuel/air interchanger reduces the size of the heat exchanger and the need for other auxiliary equipment, reducing costs while increasing turbine efficiency.

9 Claims, 5 Drawing Sheets 5,095,693

HIGH-EFFICIENCY GAS TURBINE ENGINE

This is a continuation of application Ser. No. 389,630, filed Aug. 4, 1989, now abandoned.

TECHNICAL FIELD

This invention relates to axial flow gas turbine engines and more particularly to land-based gas turbine engines requiring high efficiency with reduced noxious emissions.

BACKGROUND OF THE INVENTION

Gas turbine engines include a compression section, a combustion section and a turbine section. An annular flow path for working medium gases extends axially through these sections of the engine. Generally, air enters the compression section where it is compressed, then passes into the combustion section, where the pressurized air is mixed with a fuel (gas or liquid) and burned. The hot pressurized gases which result are then expanded through the turbine section to produce useful work, for example, by driving a generator to produce electricity or by driving a propeller in a marine propulsion system.

The overall efficiency of a gas turbine is a function of compressor and turbine efficiencies, ambient air temperature, nozzle inlet temperature and type of cycle used. Most gas turbine installations are of the open cycle type using atmospheric air as the working medium and burning relatively clean fuels such as natural gas.

Simple cycle gas turbines are relatively inefficient, with almost all losses occurring in the hot exhaust gases. When exhaust gases can be used in a boiler or for process heating, the combination of a turbine with a heat recovery apparatus results in a high efficiency power plant. Another method that results in high efficiency is to integrate the gas turbine with other process requirements.

For maximum efficiency, the turbine section must operate at the highest temperatures possible. However, high temperatures have a negative impact on turbine life. Therefore, to balance these two factors, cooling air is usually injected into the turbine, with the air flowing inside the turbine blades and vanes to cool them while they are in contact with the hot combustion gases. This air is obtained by taking a side-stream of compressed air and injecting it into the turbine section.

In land-based gas turbines, there has been a continuing trend towards improving thermal efficiency while reducing noxious emissions. One idea for improving efficiency involves precooling the turbine cooling air prior to its entry into the turbine. Such cooling increases the density of the air and increases the temperature differential, reducing the amount of cooling air needed to meet turbine cooling requirements. This reduces a loss to the cycle, by increasing the amount of compressed air which passes into the combustor, improving overall efficiency. Typically, this cooling air is obtained by passing the compressed air through a fan cooled heat exchanger for rejecting the heat of compression to the atmosphere.

To meet emission requirements for noxious gases such as nitric oxides (NOx) produced in the combustion cycle, water or steam is injected into the combustor, quenching the hottest combustion zones. Preventing a wide temperature gradient in the combustor would also minimize nitric oxide formation.

In liquid fueled turbines which produce steam by heating water with the hot exhaust gas, separate steam injection into the combustor is typically used for nitric oxide control. Water may be used with liquid fuels, by mixing with the fuel prior to injection in the combustor.

With gaseous fuels such as natural gas, steam is directly injected into the fuel gas, avoiding a separate steam injection manifold. Although steam can be injected separately into the combustor, NOx control is improved if the steam is premixed with the fuel, thereby avoiding hot spots due to insufficient steam/fuel interaction in the combustor. However, the gaseous fuel must be heated prior to mixing to avoid injecting a slug of liquid, i.e. steam condensate, into the combustor, which would cause instabilities in the combustion process or high thermal stress in the combustion chamber.

Part of the fuel heating may be accomplished by directing cooling air exiting the gas turbine enclosure to interchange through a heat exchanger with the entering fuel thereby preheating the fuel up to about 70° C. However, a relatively large heat exchanger is required as the cooling air is at atmospheric pressure and is relatively cool. In addition, further heating, up to about 120° C., must be accomplished by a second heat exchanger to prevent condensation. Therefore, low pressure steam must additionally be used, a thermal energy loss, requiring a separate heat exchanger with associated piping. Alternatively this heating could be done with heat from the turbine exhaust gas, but this reduces the heat available for producing steam.

Another alternative is to use highly superheated steam to heat the steam pipes, thus allowing a degree of cooling without condensation. However, this similarly reduces efficiency and continues the risk of water condensation after mixing with the fuel gas.

SUMMARY OF THE INVENTION

It is an object of the present invention to provide a gas turbine engine which achieves high efficiency by reducing thermal energy losses.

It is a further object of the present invention to provide a gas turbine engine which reduces noxious emissions.

It is a further object of the present invention to provide a gas turbine engine which requires fewer heat exchangers, reducing the size and cost of auxiliary systems.

According to the present invention, a gas turbine engine having compression means, combustion means and turbine means further comprises interchange means through which a compressed air side stream, exiting from the compressor means, passes, reducing the temperature of the compressed air side-stream, the interchange means increasing the temperature of a fuel, passing through the interchange means, to a temperature sufficient to prevent condensation of steam when the fuel is mixed with steam, prior to injection into the combustor means.

Interchanging the compressed air side stream with the fuel gas eliminates the need for withdrawing steam from the cycle while additionally returning the heat generated in the compression cycle to the combustion chamber, thereby increasing the overall thermal efficiency. This eliminates or reduces the need for a cooling system for interchange with the atmosphere, reducing the overall equipment requirements. The pressurized air is of a temperature sufficient to provide more than enough heat to preheat the fuel gas to the required temperature. Since no steam heat exchanger is required for preheating the fuel gas, the associated cost of the piping and a steam heat exchanger is eliminated. In addition, two large heat exchangers plus a fan system for cooling the side stream are eliminated, while the actual heat exchanger provided for preheating the fuel gas is small in size as the fuel and the air are both under pressure and at high temperatures, increasing heat transfer efficiency.

The apparatus for preheating the fuel gas is adaptable to systems where water is used instead of steam for nitric oxide suppression. In such a situation, both the water and the fuel are heated by the compressed air stream in separate heat exchangers prior to injection. Of course, the water alone could be heated, and this system is adaptable to gas turbines which utilize a liquid fuel, as the liquid fuel may be similarly heated with the compressed air.

In another embodiment of the present invention, an inert liquid may be used as an intermediate heat exchange medium to avoid the risk of a cross-over leak during interchange, which could create a hazardous fuel/air mixture. Generally, the inert medium passes through two heat exchangers, a first heat exchanger where it is heated by the compressed air and then through a second heat exchanger where the heat is transferred to the fuel for preheating. While such a system may increase equipment costs, it should be noted that the sizes of the heat exchangers will still be small compared to the previous designs as the streams will be under pressure and heat transfer efficiency will be improved.

DETAILED DESCRIPTION OF THE PREFERRED EMBODIMENTS

Figure 1:
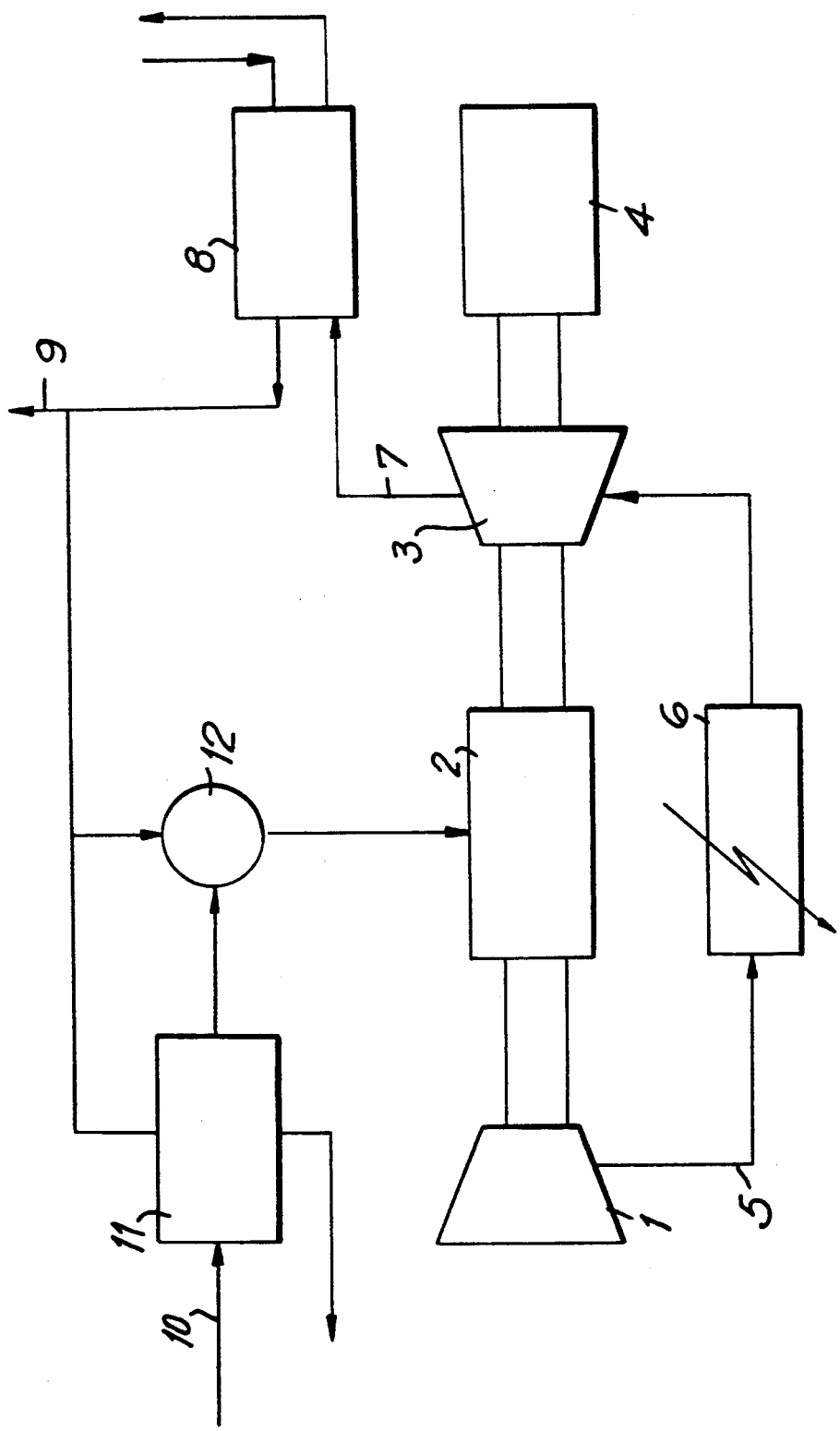
FIG. 1 is a prior art gas turbine cycle utilizing a fan type cooling air heat exchanger.

Referring to FIG. 1, a typical gas turbine cycle is shown including a compressor 1, a combustor 2, a turbine 3, with the turbine cycle of the single shaft type for driving a load 4. A compressed air stream 5 is withdrawn from the compressor, cooled in a heat exchanger 6 through interchange with the air and directed into passages in the turbine 3 for cooling the turbine blades and vanes. Heat exchanger 6 may be of the air to air, or air to water to atmospheric air type.

An exhaust stream 7 enters a waste heat boiler 8 to produce steam 9. A portion of the steam 9 is withdrawn from the waste boiler for preheating either a liquid or gaseous fuel 10, in a heat exchanger 11, as well as for mixing with the fuel in a mixer 12 for reducing nitric oxide production in the combustor 2. The steam and compressor heat losses reduce the thermal efficiency of the turbine, and require an additional capital investment in equipment. While the steam exiting the heat exchanger 11 could be expanded in a steam turbine, the losses incurred due to pressure drops and heat loss make this impractical.

Figure 2:
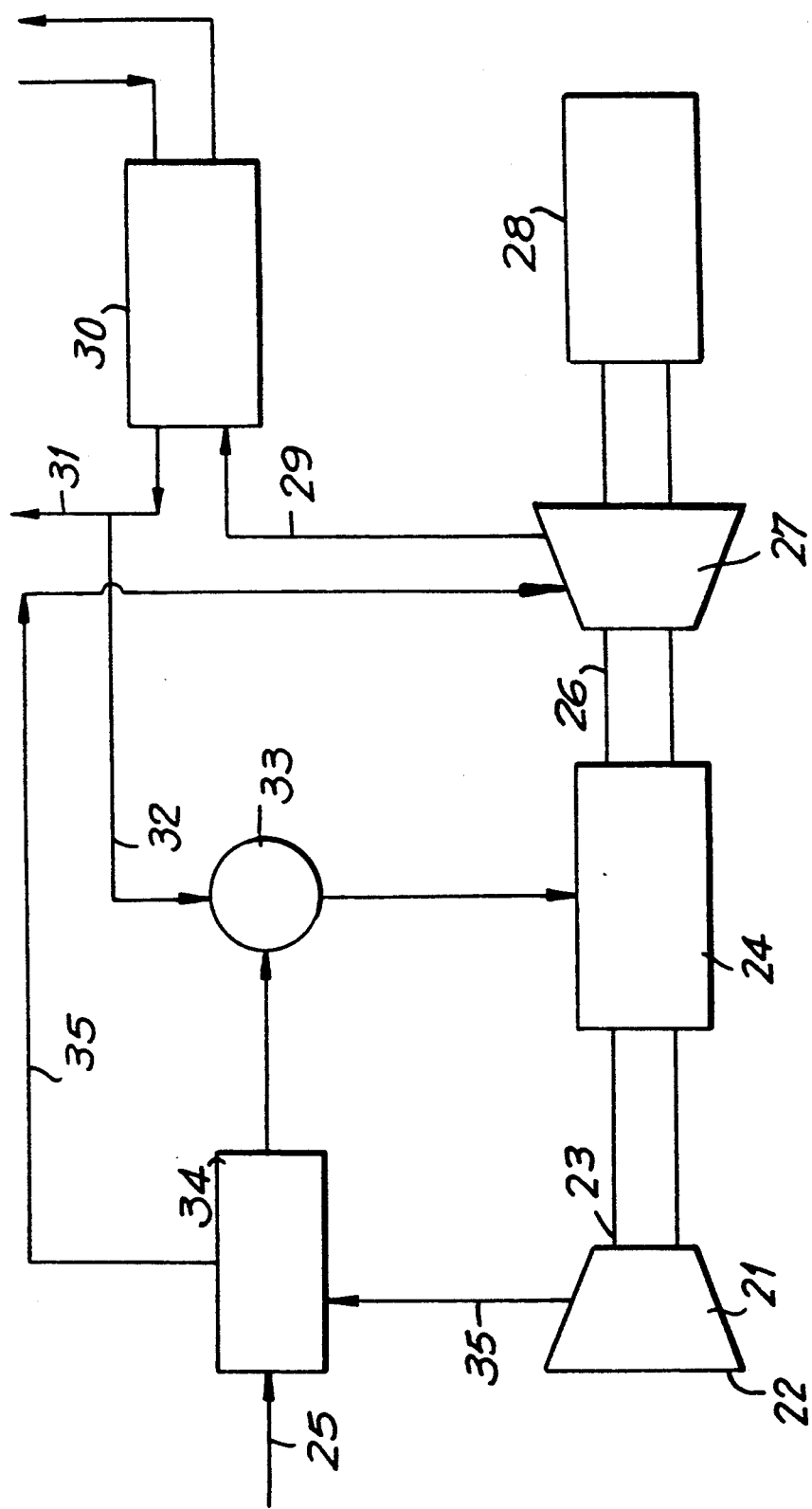
FIG. 2 is a gas turbine cycle having an interchanger for preheating a fuel with a compressed air stream prior to steam mixing.

Referring to FIG. 2, a gas turbine 20 having an interchanger for improving the thermal efficiency is shown. A compressor 21 utilizes air as the working medium with air entering at an end 22 and exiting in a compressed and heated state at 23. Generally, the air enters at a temperature of about 59° F., at atmospheric pressure. The compressed air exits the compressor at a temperature of about 750° F. at a pressure of about 235 psi.

The compressor 21 supplies the compressed air to a combustor 24. Generally, the combustor may comprise one or more chambers where a fuel 25 is ignited with the compressed air to form a hot combustion gas 26 for driving a turbine 27. The turbine 27 then drives a load 28, and expels a spent exhaust gas 29. The exhaust from the turbine enters a boiler 30 which heats water to produce steam 31 while reducing the exhaust gas temperature prior to discharge.

In order to reduce emissions, the temperatures within the combustor must be controlled to prevent hot spots which result in the production of nitric oxides. This is accomplished by adding steam or water to the fuel prior to injection into the combustor. A side stream (steam) 32 is taken and used for mixing with the fuel for nitric oxide suppression. The side stream 32 is added to the fuel 25 in a mixer 33.

Referring still to FIG. 2, the fuel 25 generally arrives at about ambient temperatures from a source of supply such as a natural gas feed main or may be supplied at somewhat elevated temperature after exiting a booster compressor. Typically, the gas may be supplied at from 60 to 400 psi, at temperatures of from 59° to 300° F. Should steam be mixed with the fuel for reducing nitric oxide emissions, it is possible that some of the steam would condense within the pipe and impinge on the cumbustor wall, causing combustion instability or high thermal stress. Therefore, a preheat interchanger 34 is included in the fuel supply to the mixer 33. The fuel 25 is preheated by interchange with a compressed cooling air stream 35. Thus part of the heat of compression is transferred to the fuel and returned to the turbine cycle when injected into the combustor. If liquid fuel is used, the degree of fuel heating is limited to a temperature below the fuel coking limit which is between about 200°-300° F.

The cooled air stream 35 continues to the turbine inlet and is used to maintain the turbine blade temperatures within the limits of the materials of construction. Depending on the relative heat loads and initial temperatures of the fuel and compressed air, it may be necessary to have a second heat exchanger for rejecting heat to the atmospheric from the cooling air 35. This heat exchanger would be smaller and of lower cost than it would have been if the fuel heat exchanger were not used.

Figure 3:
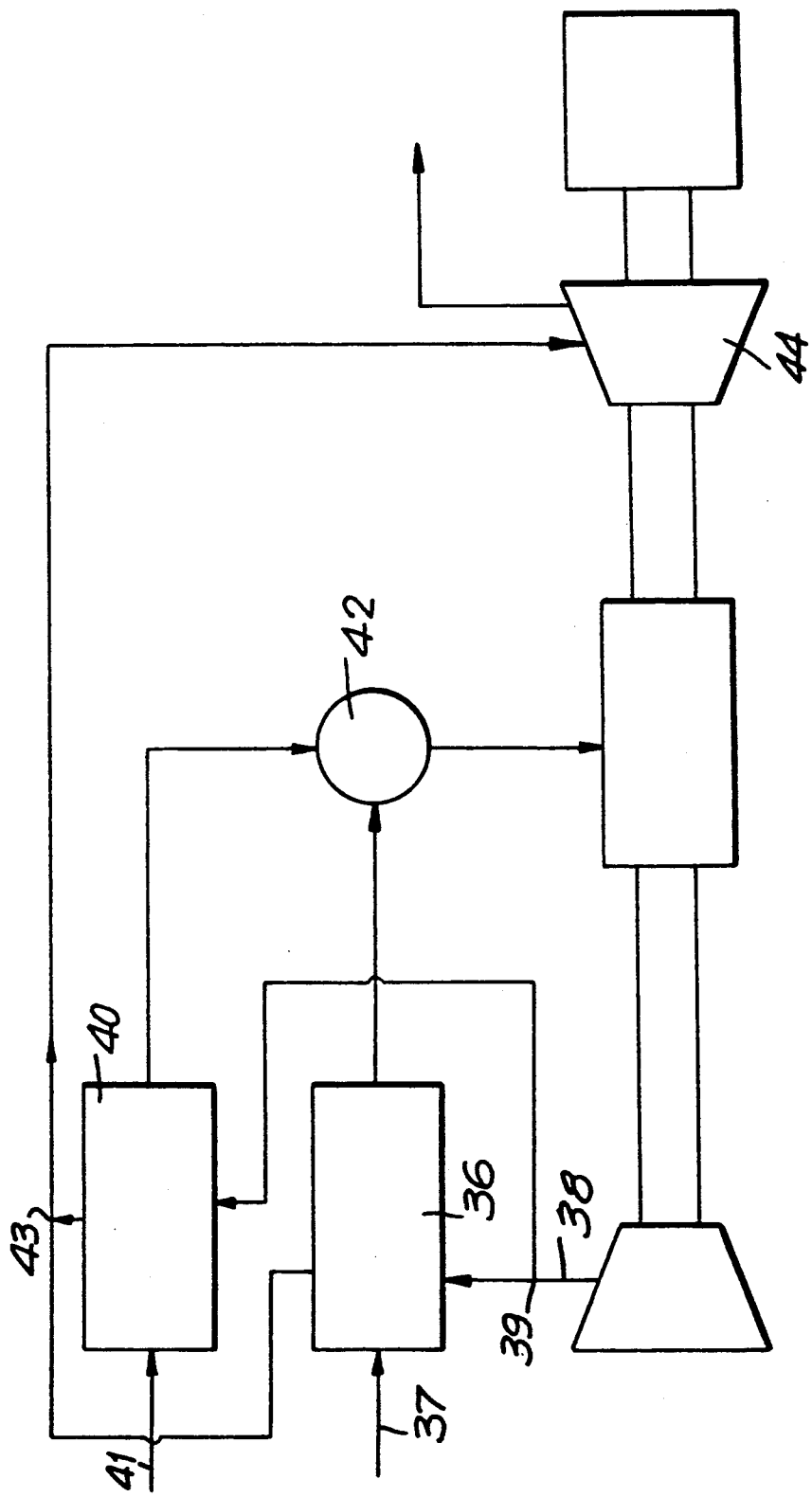
FIG. 3 is another embodiment of the present invention using a liquid fuel and liquid water injection for reducing noxious emissions, both preheated with compressed air.

Referring to FIG. 3, a compressor, combustor and turbine are shown as previously described, however the gas turbine cycle utilizes a liquid or gaseous fuel and water rather than steam for nitric oxide suppression. Usually, the water is sprayed into the combustor with the fuel to avoid slugs of water disturbing combustion. In this embodiment, a first interchanger 36 is used to preheat a fuel stream 37, through heat transferred from a compressed air stream 38. The compressed air stream is split at 39, with a part of the stream entering a second interchanger 40. The second interchanger 40 is used to preheat a water stream 41, prior to entering a mixer 42, where the heated water and fuel mix prior to injection. Of course, separate direct injection into the combustor could also be used, avoiding the need for the mixer 42. The exiting compressed air streams may be combined at 43, and continue on to a turbine 44. Alternatively, the fuel and water heat exchangers, 36 and 40, could be in series rather than in parallel, relative to the stream 38. In either case, interchange is utilized to preheat both the fuel and the water prior to injection into the combustor. The temperature of the compressed air is sufficient to generate steam instead of hot water in the interchanger of this invention. Generally, economic and operating considerations are used to choose between steam and hot water.

Through control of the cooling air stream 38, only the water or only the fuel may be preheated. For example, shutoff or control valves could be used to isolate either of the interchangers. This could produce the best economics depending on the amount of heat available in the cooling air side stream.

Figure 4:
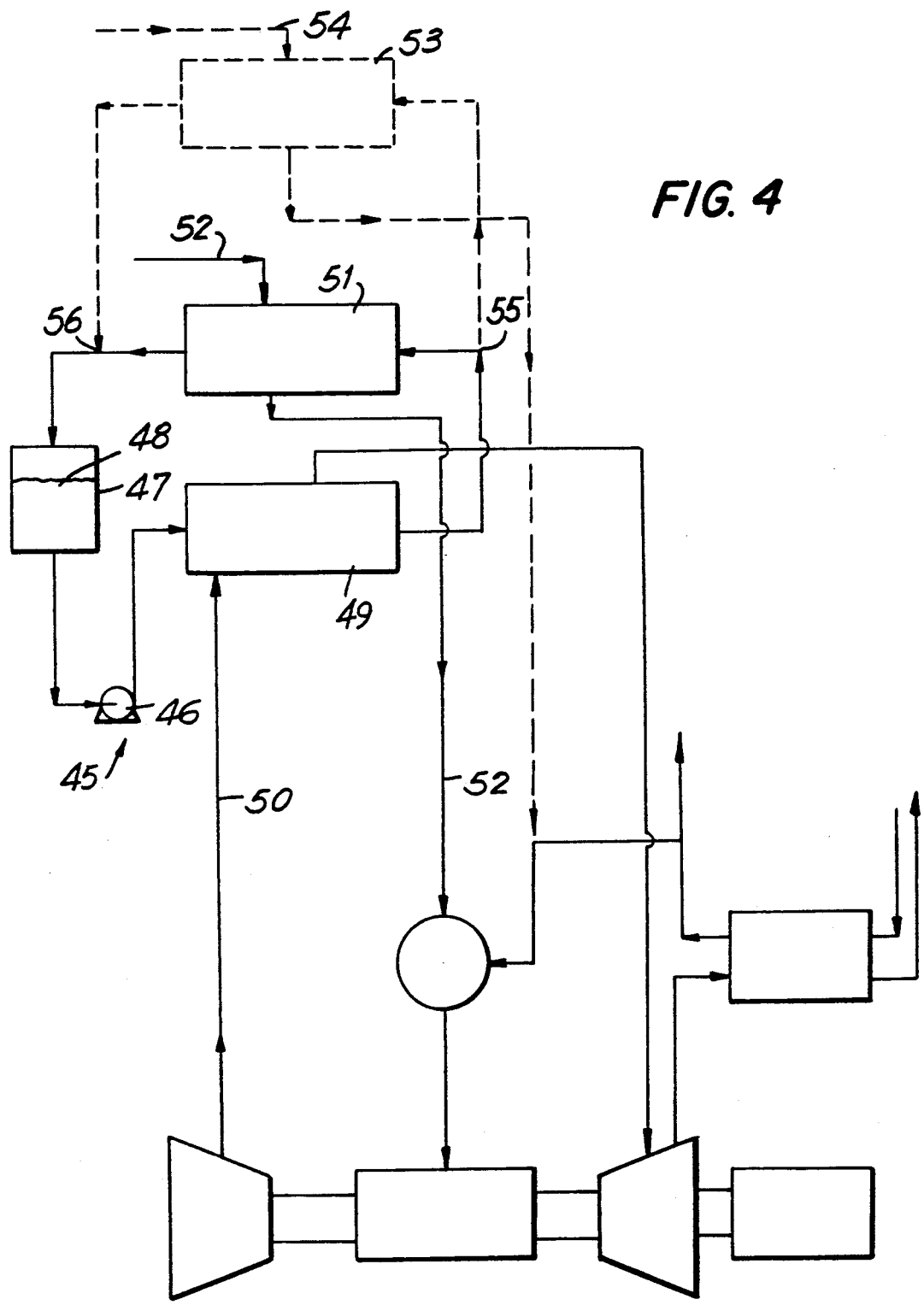
FIG. 4 is another embodiment of the present invention using closed cycle interchange with an inert heat transfer fluid.

Referring to FIG. 4, an alternative embodiment of the present invention is shown including an inert heat transfer fluid recirculated for exchanging heat between the compressed air and fuel gas streams. Such a system may be desirable to prevent the possibility of a leak in the interchanger causing the fuel and air to mix in an explosive concentration. A recirculation system 45 has a pump 46 and a reservoir 47 for holding a heat transfer fluid 48 which may comprise a Dowtherm type material, or any suitable equivalent. The fluid 48 is pumped from the reservoir to a first interchanger 49 through which a hot compressed air stream 50 passes. The fluid 48 is thus heated and then passed through a second interchanger 51 through which a fuel 52 flows. Thus, heat gained from the compressed air stream is transferred from the fluid 48 to the fuel 52. The fluid then returns to the reservoir 47 for another cycle.

An addition to the system, where water must be preheated as well as the fuel, is shown in phantom in FIG. 4. Referring still to FIG. 4, a third interchanger 53 is included in a water supply 54. The fluid 48 is split at 55 with part of the heated fluid going to preheat the fuel in the second interchanger 51 and the remainder going to preheat the water in the third interchanger 53. The fluid streams are combined at 56 and returned to the reservoir 47.

Figure 5:
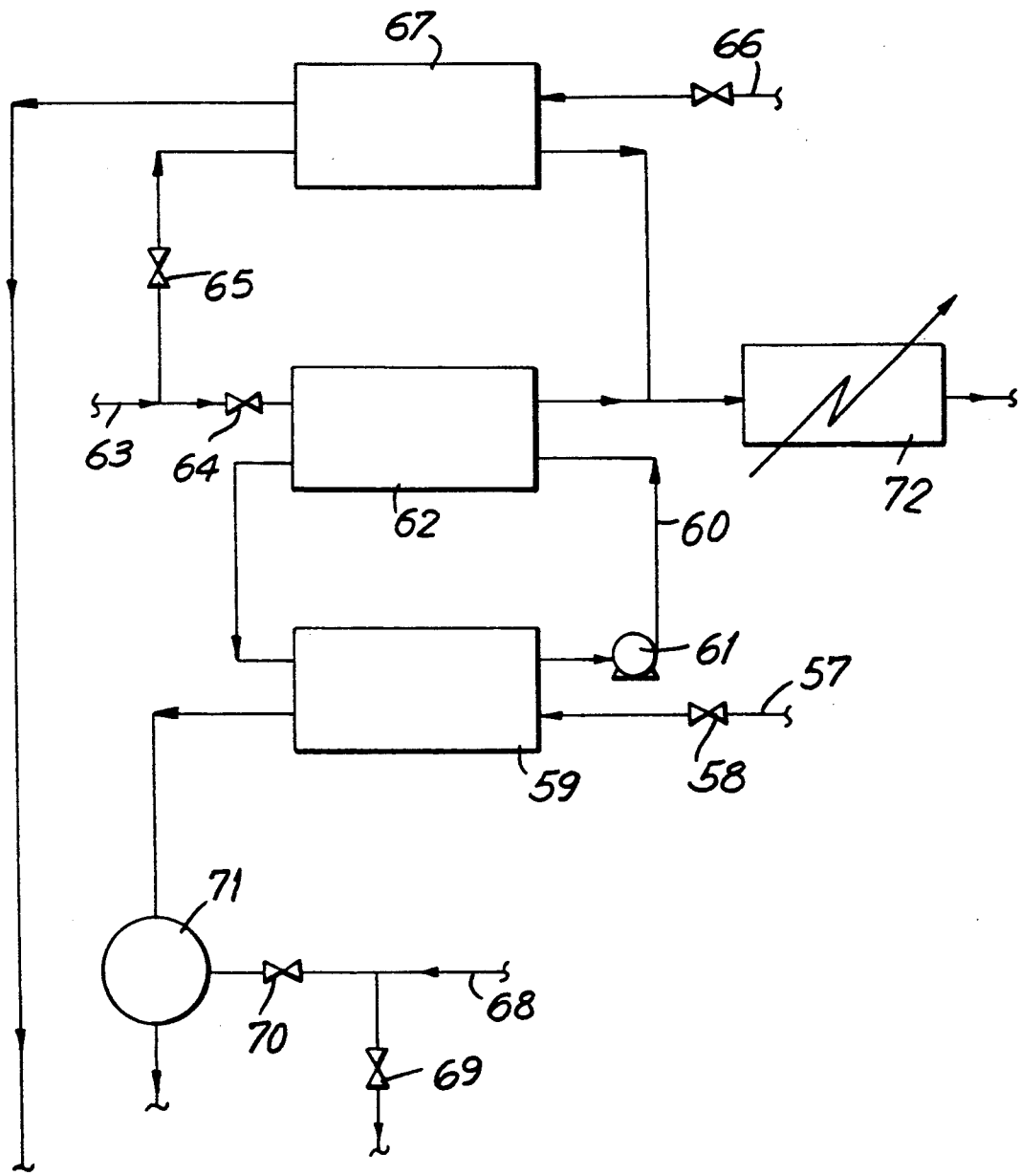
FIG. 5 is another embodiment of the present invention, adapted to accommodate both gaseous and liquid fuels in one system.

Referring to FIG. 5, another embodiment of the present invention is shown which allows either a gaseous or liquid type of fuel to be used. A gaseous fuel 57 is supplied, through a valve 58, to a heat exchanger 59. An inert fluid 60 is circulated by a pump 61 in a closed loop through the exchanger 59 and a heat exchanger 62 through which a compressed air stream 63 passes. The compressed air stream is directed through either a first valve 64 or a second valve 65, depending on the type of fuel supplied. Where a liquid fuel 66 is used, a heat exchanger 67 interchanges heat directly from the air stream 63 to the fuel 66. Steam 68 similarly is directed by either a first valve 69 for direct injection into a combustor (not shown) or by a second valve 70 for mixing with the fuel 57 in a mixer 71. An auxiliary exchanger 72 is provided to further cool the compressed air stream 63 prior to entering a turbine (not shown). This may be either an air or water heat exchanger. This arrangement is suitable for those turbines where fuel supplies and types may vary, allowing an operator to control the gas turbine interchangers for optimum efficiency with minimized emissions.

While the preferred embodiments have been described in relation to a gas turbine engine for land based uses, it will be understood by those skilled in the art that the various other gas turbines could utilize the high efficiency/low emission gas turbine of the present invention. Consequently, it will be understood by those skilled in the art that various changes or modifications could be made without varying from the present invention.

I claim:

1. A high efficient gas turbine engine, having compression means, combustion means, turbine means, and means for reducing nitrous oxide emissions from an exhaust gas stream exiting from the turbine means, the engine further comprising:

interchange means in fluid communication with a hot compressed air stream exiting from the compressor means, for cooling the compressed air stream as it passes therethrough;

means for delivering the cooled compressed air stream to the turbine means for cooling the turbine means, a fuel, in fluid communication with the interchange means, and separability passable therethrough, the fuel heated by the hot compressed air stream prior to entering the combustion means and, pre-mixer means for reducing the nitrous oxide emissions, the heated fuel entering the pre-mixer means and mixed with steam prior to entering the combustion means, the entering fuel being at a temperature which prevents condensation of the steam during mixing.

2. The gas turbine engine of claim 1 wherein the interchange means comprise a heat exchanger, heat transferred between the compressed air and the fuel in a non-contact manner.

3. The gas turbine engine of claim 1 wherein the fuel is a gaseous fuel.

4. The gas turbine engine of claim 1 wherein the fuel is a liquid fuel.

5. The gas turbine engine of claim 1 wherein the interchange means is a first heat exchanger; and, further comprising a second heat exchanger, in fluid communication with the compressed air stream, and separably, in fluid communication with a water stream, for transferring heat from the compressed air stream to the water stream.

6. The gas turbine engine of claim 1 wherein the interchange means comprise a closed loop heat transfer system including an inert fluid; pump means for recirculating the inert fluid; a reservoir for containing a portion of the fluid; first heat exchanger means, through which the fluid is passed, the compressed air stream separably passed through the first heat exchanger means, wherein the fluid is heated thereby; second heat exchanger means through which the fluid exiting from the first heat exchange means is passed, the fuel separably passed through the second heat exchanger means, wherein the fuel is heated to a desired temperature, the fluid then returned to the reservoir for recycling.

7. The gas turbine engine of claim 5 wherein the compressed air travels through the first and second heat exchangers in parallel.

8. The gas turbine engine of claim 6 further comprising a third heat exchange means, the fluid, exiting from the first heat exchange means which is in fluid communication with the third heat exchange means, passing therethrough; and, water, separably passed through the third heat exchange means, and being heated thereby.

9. A method for operating a gas turbine engine having compression means, combustion means, and turbine means, the method comprising:

providing interchange means in fluid communication with a hot compressed air stream exiting from the compressor means;

passing the compressed air stream through the interchange means for reducing the temperature of the compressed air stream;

delivering the cooled compressed air stream to the turbine means for cooling the turbine means;

passing a fuel, separably, through the interchange means for heating the fuel using the hot compressed air stream;

providing pre-mixer means for reducing nitrous oxide emissions from the exhaust gas stream exiting from the turbine means; and, mixing the heated fuel in the pre-mixer means with steam prior to entering the combustion means, the fuel being at a temperature which prevents condensation of the steam during mixing.

* * * * *